(12) United States Patent
Taniguchi et al.

(10) Patent No.: US 12,212,255 B2
(45) Date of Patent: Jan. 28, 2025

(54) ELECTRIC MOTOR CONTROL DEVICE, VEHICLE, AND ELECTRIC MOTOR CONTROL METHOD

(71) Applicant: Hitachi Astemo, Ltd., Hitachinaka (JP)

(72) Inventors: Shun Taniguchi, Tokyo (JP); Kentaro Matsuo, Hitachinaka (JP); Kenichi Yoshida, Hitachinaka (JP); Toshiyuki Ajima, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 85 days.

(21) Appl. No.: 18/012,419

(22) PCT Filed: Apr. 20, 2021

(86) PCT No.: PCT/JP2021/016036
§ 371 (c)(1),
(2) Date: Dec. 22, 2022

(87) PCT Pub. No.: WO2022/064750
PCT Pub. Date: Mar. 31, 2022

(65) Prior Publication Data
US 2023/0246579 A1 Aug. 3, 2023

(30) Foreign Application Priority Data
Sep. 25, 2020 (JP) ................................. 2020-160381

(51) Int. Cl.
*H02P 1/46* (2006.01)
*B60L 50/51* (2019.01)
(Continued)

(52) U.S. Cl.
CPC .............. *H02P 21/14* (2013.01); *B60L 50/51* (2019.02); *H02P 21/22* (2016.02); *H02P 27/06* (2013.01)

(58) Field of Classification Search
CPC .......... H02P 21/14; H02P 21/22; H02P 27/06; H02P 6/10; H02P 27/04; H02P 27/08; B60L 50/51
See application file for complete search history.

(56) References Cited

U.S. PATENT DOCUMENTS

2019/0252972 A1 8/2019 Minaki et al.
2019/0256128 A1 8/2019 Takase et al.

FOREIGN PATENT DOCUMENTS

EP 2515431 A2 10/2012
JP 2012-165608 A 8/2012
(Continued)

OTHER PUBLICATIONS

International Search Report, PCT/JP2021/022117, dated Jun. 8, 2021. 2 pages.

*Primary Examiner* — Karen Masih
(74) *Attorney, Agent, or Firm* — Volpe Koenig (57) ABSTRACT

Provided are an electric motor control device and an electric motor control method with high reliability capable of performing noise reduction control (or sensorless control) by superimposing a radio-frequency voltage and capable of performing compensation of a dead time of an inverter with a minimum necessary configuration. The electric motor control device includes: a radio-frequency voltage superimposing unit that adds a radio-frequency voltage command value to a fundamental wave voltage command value and outputs a voltage command value; a radio-frequency current estimation value calculation unit that estimates a radio-frequency current value from the radio-frequency voltage command value; a dead time compensation current estimation value calculation unit that adds a radio-frequency current estimation value estimated by the radio-frequency current estimation value calculation unit to a fundamental wave current command value; and a dead time compensa- (Continued)

tion voltage calculation unit that compensates an output voltage of an inverter according to a dead time compensation current estimation value calculated by the dead time compensation current estimation value calculation unit.

13 Claims, 7 Drawing Sheets

(51) Int. Cl.
    *H02P 21/14*     (2016.01)
    *H02P 21/22*     (2016.01)
    *H02P 27/06*     (2006.01)

(56) References Cited

FOREIGN PATENT DOCUMENTS

| | | | |
|---|---|---|---|
| JP | 5401500 B2 | 1/2014 | |
| JP | 2015-126641 A | 7/2015 | |
| WO | 2018/016356 A1 | 1/2018 | |
| WO | WO-2018016476 A1 * | 1/2018 | ............. B62D 5/046 |

* cited by examiner

ELECTRIC MOTOR CONTROL DEVICE, VEHICLE, AND ELECTRIC MOTOR CONTROL METHOD

TECHNICAL FIELD

The present invention relates to a configuration of a motor control device and a method for controlling the motor control device, and particularly relates to a technique effective for application to noise reduction control of a motor.

BACKGROUND ART

In an automobile motor, in order to enhance quietness, for example, an active noise reduction technique for reducing noise by making distortion of a counter electromotive voltage, which is generated in the motor by superimposing a constant voltage from an inverter, into a sine wave has been studied together with a passive noise reduction technique such as addition of a sound absorbing material or a sound insulating material for suppressing propagation of noise.

In many applications such as industrial inverters, sensorless control is applied which estimates the rotation angle of the motor from a radio-frequency current flowing by superimposing a radio-frequency voltage that does not directly contribute to the torque of the motor.

However, in a case where the control of superimposing the radio-frequency voltage is applied, there is a possibility that the dead time of the inverter cannot be correctly compensated due to the influence of the radio-frequency current flowing by the superimposed radio-frequency voltage.

As a background art of the present technical field, for example, there is a technique such as PTL 1. In PTL 1, a radio-frequency voltage is superimposed for estimation of a rotation angle separately from a current control system.

On the other hand, as a technique for compensating for a voltage error due to the dead time of the inverter, a method is used which calculates a dead time compensation amount from a three-phase fundamental wave current command value of the motor. For example, in PTL 2, in order to prevent that the dead time compensation cannot be appropriately performed due to the harmonic current, a reactive current that does not contribute to torque is caused to flow at the time of low current.

CITATION LIST

Patent Literature

PTL 1: Japanese Patent No. 5401500
PTL 2: JP 2015-126641 A

SUMMARY OF INVENTION

Technical Problem

According to PTL 1, it is possible to accurately detect the rotation state of the rotor without using a sensor for detecting the rotation state of the rotor while maintaining the operation of the electric motor even during the high-torque operation.

However, due to the influence of superimposing a radio frequency, the dead time compensation cannot be appropriately performed, and noise and torque ripple due to the dead time may occur.

According to PTL 2 described above, the dead time compensation can be appropriately performed even in a state where a radio-frequency voltage is superimposed, but on the other hand, a power loss increases due to a reactive current.

In this regard, an object of the present invention is to provide an electric motor control device and an electric motor control method with high reliability capable of performing noise reduction control (or sensorless control) by superimposing a radio-frequency voltage and capable of performing compensation of a dead time of an inverter with a minimum necessary configuration.

Solution to Problem

In order to solve the above problem, the present invention includes: a radio-frequency voltage superimposing unit that adds a radio-frequency voltage command value to a fundamental wave voltage command value and outputs a voltage command value; a radio-frequency current estimation value calculation unit that estimates a radio-frequency current value from the radio-frequency voltage command value; a dead time compensation current estimation value calculation unit that adds a radio-frequency current estimation value estimated by the radio-frequency current estimation value calculation unit to a fundamental wave current command value; and a dead time compensation voltage calculation unit that compensates an output voltage of an inverter according to a dead time compensation current estimation value calculated by the dead time compensation current estimation value calculation unit.

The present invention includes: adding a radio-frequency voltage command value to a fundamental wave voltage command value and outputting a voltage command value; estimating a radio-frequency current value from the radio-frequency voltage command value; adding the estimated radio-frequency current estimation value to a fundamental wave current command value; and compensating an output voltage of an inverter according to a result of the addition.

Advantageous Effects of Invention

According to the present invention, in the electric motor control device and the electric motor control method capable of performing noise reduction control (or sensorless control) by superimposing the radio-frequency voltage, it is possible to realize the electric motor control device and the electric motor control method with high reliability capable of performing compensation of a dead time of the inverter with a minimum necessary configuration.

Accordingly, noise reduction and reliability improvement during motor driving can be achieved.

Problems, configurations, and effects other than those described above will be clarified by the following description of embodiments.

DESCRIPTION OF EMBODIMENTS

Hereinafter, embodiments of the present invention will be described with reference to the drawings. Incidentally, in the drawings, the same components are denoted by the same reference signs, and the detailed description of overlapping components is omitted.

In the following description, a permanent magnet synchronous motor (PMSM) is targeted, but the present invention is not limited thereto, and similar effects can be obtained as long as it is an AC machine such as a synchronous reluctance motor, a permanent magnet synchronous generator, a winding-type synchronous machine, an induction motor, and an induction generator. In addition, although a semiconductor switching element of an inverter device targets an IGBT, the present invention is not limited thereto, and the semiconductor switching element may be a MOSFET or may be another power semiconductor element.

First Embodiment

Figure 1:
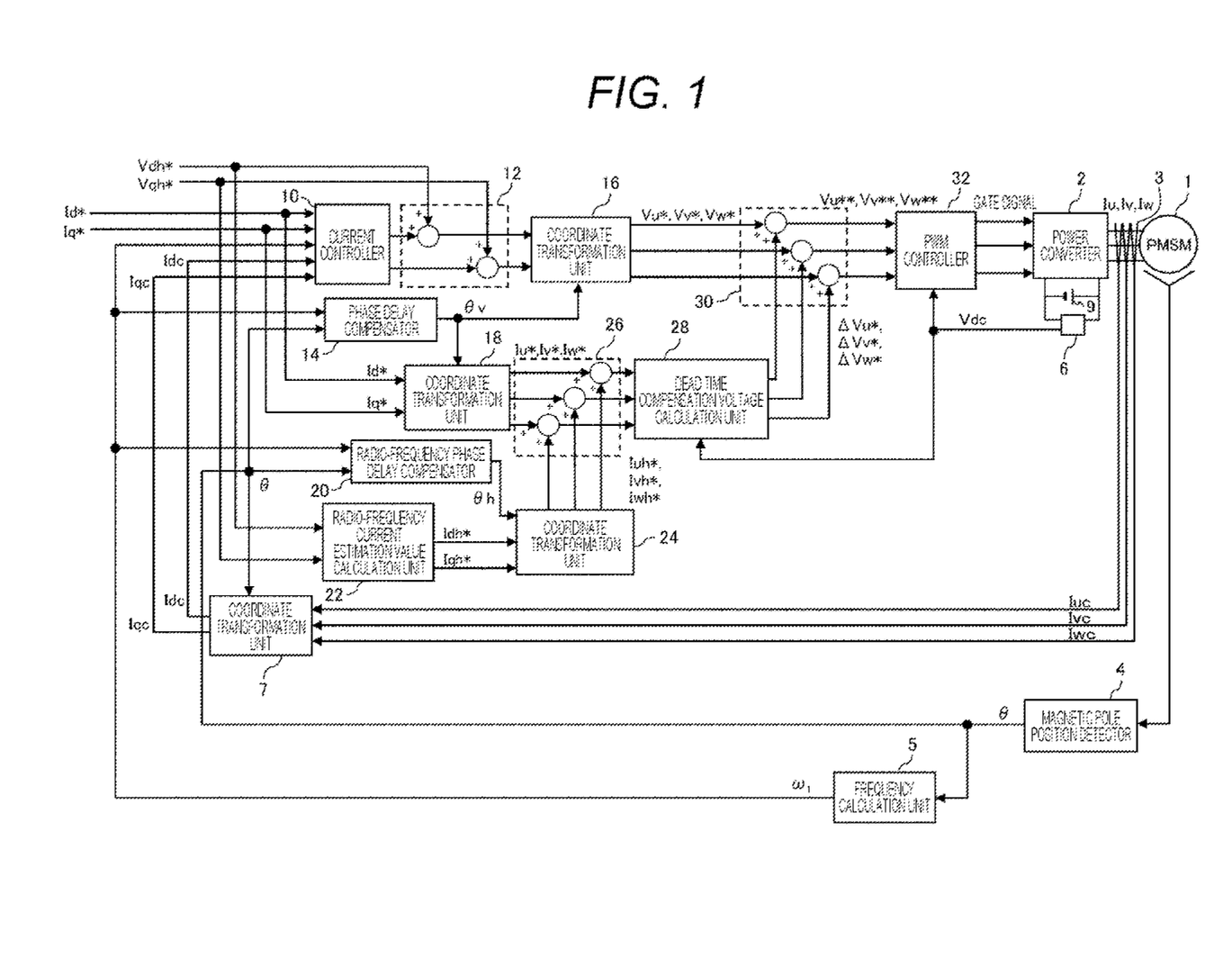
FIG. 1 is a block diagram illustrating an overall configuration of a motor control device according to a first embodiment of the present invention.

An electric motor control device and an electric motor control method according to a first embodiment of the present invention will be described with reference to FIGS. 1 to 8. FIG. 1 is a block diagram illustrating an overall configuration of the motor control device according to the present embodiment.

As illustrated in FIG. 1, the motor control device of the present embodiment includes a power converter 2, a phase current detection unit 3, a magnetic pole position detector 4, a frequency calculation unit 5, a DC voltage detection unit 6, a coordinate transformation unit 7, a current controller 10, a radio-frequency voltage superimposing unit 12, a phase delay compensator 14, a coordinate transformation unit 16, a coordinate transformation unit 18, a radio-frequency phase delay compensator 20, a radio-frequency current estimation value calculation unit 22, a coordinate transformation unit 24, a dead time compensation current estimation value calculation unit 26, a dead time compensation voltage calculation unit (dead time compensator) 28, a dead time compensation unit 30, and a PWM controller 32.

The power converter 2 converts DC power from a DC voltage source 9 (for example, a battery) into AC power according to a gate signal to be described later, and drives a permanent magnet synchronous motor (PMSM) 1.

The phase current detection unit 3 includes a Hall CT (Current Transformer) or the like, and detects current waveforms Iuc, Ivc, and Iwc of three phases of a U phase, a V phase, and a W phase flowing from the power converter 2 to the PMSM 1.

The magnetic pole position detector 4 includes a resolver or the like, detects the magnetic pole position of the PMSM 1, and outputs magnetic pole position information θ.

The frequency calculation unit 5 outputs speed information ω1 from the magnetic pole position information θ detected by the magnetic pole position detector 4, for example, by differential calculation.

The coordinate transformation unit 7 coordinate-transforms the current waveforms Iuc, Ivc, and Iwc detected by the phase current detection unit 3 with the magnetic pole position information θ detected by the magnetic pole position detector 4, and outputs dq-axis current detection values Idc and Iqc.

The current controller 10 includes, for example, a PI controller or the like, and outputs dq-axis fundamental wave voltage command values Vd* and Vq* such that dq-axis fundamental wave current command values Id* and Iq* match the dq-axis current detection values Idc and Iqc.

The radio-frequency voltage superimposing unit 12 adds dq-axis radio-frequency voltage command values Vdh* and Vqh* to the dq-axis fundamental wave voltage command values Vd* and Vq*, and outputs dq-axis voltage command values Vd and Vq.

The phase delay compensator 14 corrects an amount of control delay by using the speed information ω1 with respect to the magnetic pole position information θ and outputs a voltage magnetic pole position θv. The control delay is a time from the detection of the magnetic pole position until reflection in a three-phase voltage, and for example, in triangular wave comparison PWM, delay compensation equivalent to 1.5 times of the control cycle is performed on a control cycle Δt as shown in Expression (1).

[Mathematical Formula 1]

$$\theta_v = \theta + 1.5 * \omega_1 * \Delta t \quad (1)$$

The coordinate transformation unit 16 coordinate-transforms the dq-axis voltage command values Vd and Vq output by the radio-frequency voltage superimposing unit 12 at the voltage magnetic pole position θv calculated by the phase delay compensator 14, and outputs three-phase fundamental wave voltage command values Vu*, Vv*, and Vw*.

The coordinate transformation unit 18 coordinate-transforms the dq-axis fundamental wave current command values Id* and Iq* at the voltage magnetic pole position θv, and outputs three-phase fundamental wave current command values Iu*, Iv*, and Iw*.

The radio-frequency current estimation value calculation unit 22 calculates radio-frequency current estimation values Idh* and Iqh* from the dq-axis radio-frequency voltage command values Vdh* and Vqh* by using an inverse model of the motor as shown in Expression (2), for example. The calculation can be performed in a simple manner by using the inverse model.

[Mathematical Formula 2]

$$\begin{bmatrix} I_{dh}^* \\ I_{qh}^* \end{bmatrix} = \begin{bmatrix} \dfrac{1}{R + sL_d} & 0 \\ 0 & \dfrac{1}{R + sL_q} \end{bmatrix} \begin{bmatrix} V_{dh}^* \\ V_{qh}^* \end{bmatrix} \quad (2)$$

The radio-frequency phase delay compensator 20 corrects an amount of control delay by using the speed information ω1 with respect to the magnetic pole position information θ and outputs a radio-frequency magnetic pole position θh. The control delay is a time from the detection of the magnetic pole position until reflection in a three-phase voltage, and for example, in the triangular wave comparison PWM, delay compensation equivalent to 1.5 times of the control cycle is performed on the control cycle. The difference from the phase delay compensator 14 is that the radio-frequency phase delay compensator 20 performs the delay compensation in consideration of a frequency ωh of a radio frequency as shown in Expression (3).

[Mathematical Formula 3]

$$\theta_h = \theta + \omega_h * \Delta t \quad (3)$$

The coordinate transformation unit 24 coordinate-transforms the dq-axis radio-frequency current estimation values Idh* and Iqh* calculated by the radio-frequency current estimation value calculation unit 22 at the radio-frequency magnetic pole position θh calculated by the radio-frequency phase delay compensator 20, and outputs three-phase radio-frequency current estimation values Iuh*, Ivh*, and Iwh*.

Note that it is desirable to use different values for the phase used by the coordinate transformation unit 18 that coordinate-transforms the dq-axis fundamental wave current command values Id* and Iq* and the phase used by the coordinate transformation unit 24 that coordinate-transforms dq-axis radio-frequency current estimation values Idh* and Iqh*. By using different values, phase delay can be appropriately compensated.

The dead time compensation current estimation value calculation unit 26 adds the three-phase fundamental wave current command values Iu*, Iv*, and Iw* and the three-phase radio-frequency current estimation values Iuh*, Ivh*, and Iwh* to output three-phase current command values Iu, Iv, and Iw**.

The dead time compensation voltage calculation unit (dead time compensator) 28 outputs dead time compensation three-phase voltage command values ΔVu*, ΔVv*, and ΔVw* according to the signs of the three-phase current command values Iu, Iv, and Iw** as shown in Expression (4).

[Mathematical Formula 4]

$$\begin{bmatrix} \Delta V_u^* \\ \Delta V_v^* \\ \Delta V_w^* \end{bmatrix} = V_{dc} * T_d * f_c * \text{sign}\left(\begin{bmatrix} I_u^{} \\ I_v^{} \\ I_w^{**} \end{bmatrix}\right) \quad (4)$$

Here, Vdc represents inverter DC voltage information, Td represents a dead time, fc represents a PWM carrier frequency, and Sign represents a sign.

The dead time compensation unit 30 adds the dead time compensation three-phase voltage command values ΔVu*, ΔVv*, and ΔVw* to the three-phase fundamental wave voltage command values Vu*, Vv*, and Vw*, and outputs three-phase voltage command values Vu, Vv, and Vw**.

The DC voltage detection unit 6 detects the voltage of the DC voltage source 9 and outputs DC voltage information Vdc.

The PWM controller 32 performs, for example, triangular wave comparison by using the three-phase voltage command values Vu, Vv, and Vw** and the DC voltage information Vdc, and outputs a gate signal.

Figure 2:
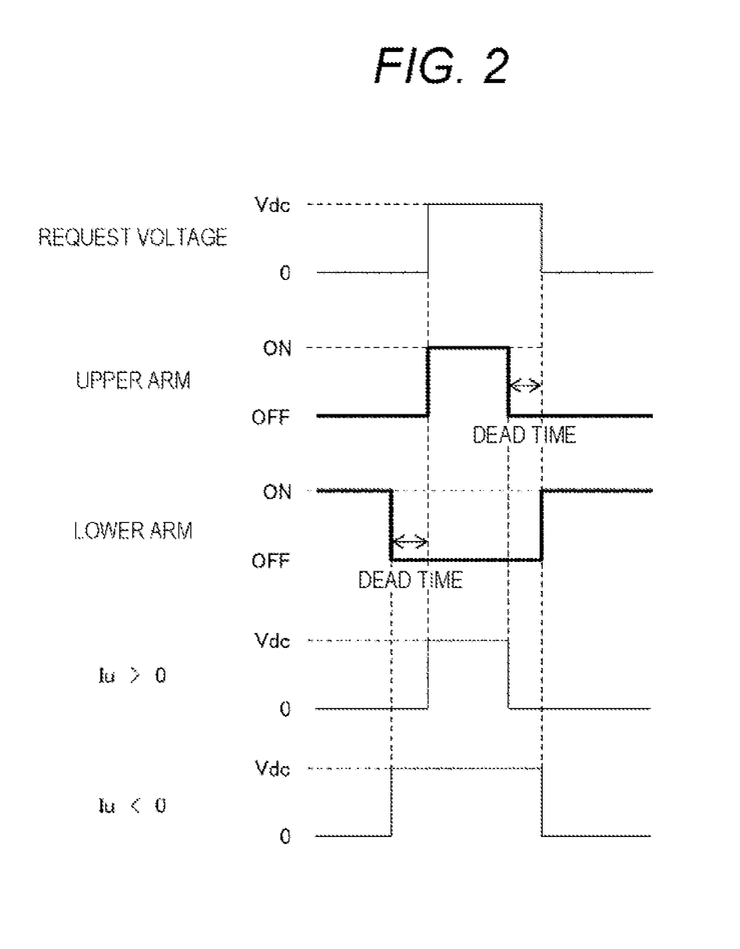
FIG. 2 is a diagram illustrating a definition of a dead time.
Figure 3:
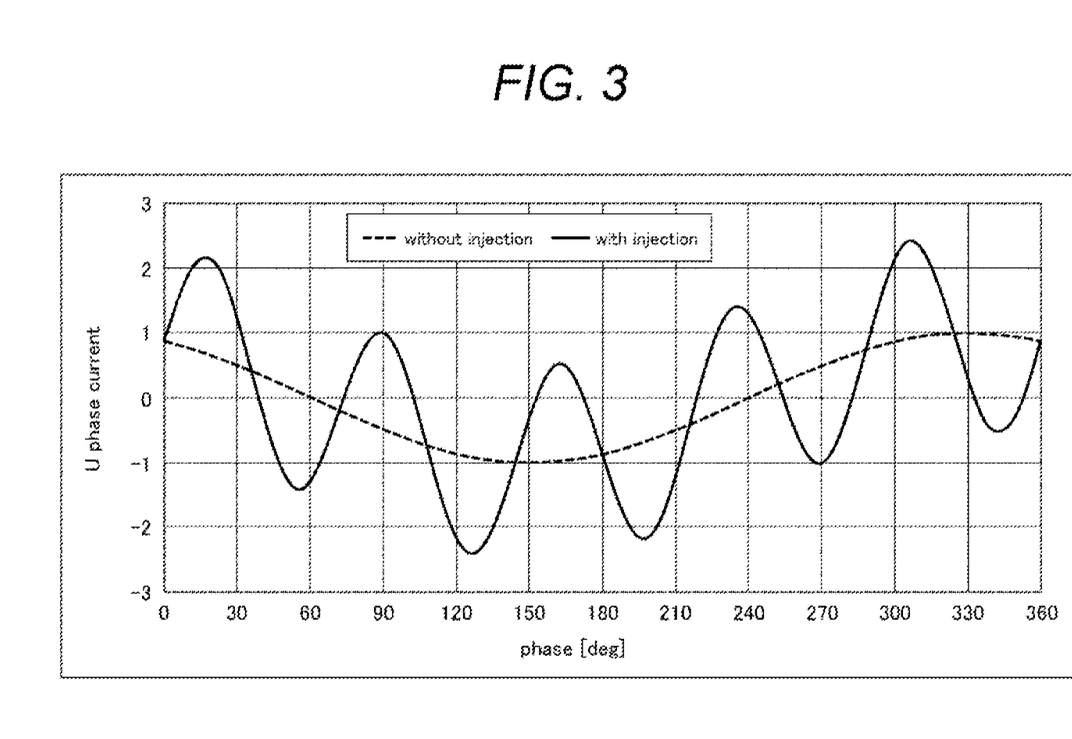
FIG. 3 is a diagram illustrating a comparative example of a current waveform based on the presence or absence of superimposition of a radio-frequency voltage.
Figure 4:
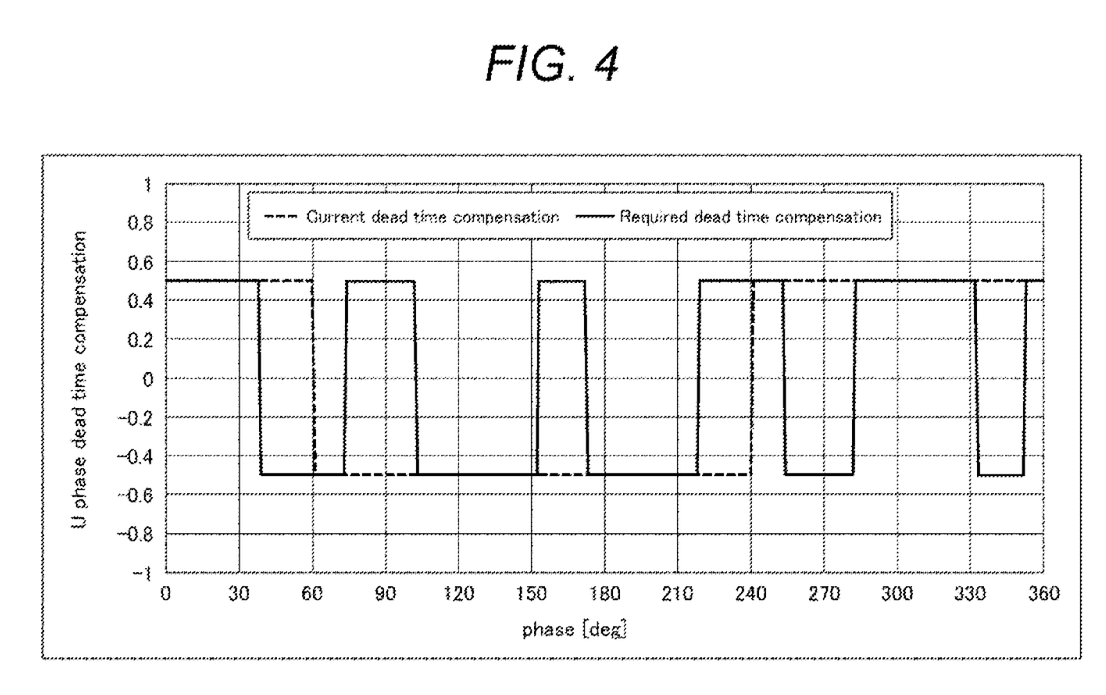
FIG. 4 is a diagram illustrating a comparative example of dead time compensation based on the presence or absence of consideration of a radio-frequency current.

The principle and effect of the present invention will be described with reference to FIGS. 2 to 4. FIG. 2 is a diagram illustrating a definition of the dead time. FIG. 3 is a diagram illustrating a comparative example of the current waveform based on the presence or absence of superimposition of the radio-frequency voltage, and FIG. 4 is a diagram illustrating a comparative example of the dead time compensation based on the presence or absence of consideration of the radio-frequency current.

In the inverter, when the upper arm and the lower arm are simultaneously turned on, the DC voltage Vdc is directly applied to the IGBT, and the IGBT may be damaged. In order to prevent this, it is necessary to provide a time (dead time) for turning off both the upper arm and the lower arm so that the upper arm and the lower arm are not simultaneously turned on as illustrated in FIG. 2.

The voltage during the dead time is determined by the sign of the current of the motor, and the inverter output voltage decreases when the sign of the current is positive, and conversely, the inverter output voltage increases when the sign of the current is negative. In order to compensate for the error of the output voltage due to the dead time, the output voltage of the inverter is compensated according to the sign of the three-phase current. In general, when a detection current is used, the dead time compensation cannot be appropriately performed due to harmonics included in the detection current, and thus a current command value is used.

On the other hand, a radio-frequency voltage may be superimposed for noise reduction in a low-speed range where there is a margin in the output voltage. At this time, a radio-frequency current flows due to the superimposed radio-frequency voltage. The sign of the current is changed by the radio-frequency current, and the dead time compensation cannot be appropriately performed, which is problematic. In particular, in a case where the fundamental wave current is small, as illustrated in FIGS. 3 and 4, the sign of the current is originally changed by the radio-frequency current, but when the dead time compensation is performed according to the fundamental wave current command value, the dead time compensation is deviated.

In this regard, in the present invention, a flowing radio-frequency current value is estimated from the superimposed radio-frequency voltage by using the inverse model of the motor, and the radio-frequency current estimation value is added to the fundamental wave current command value when the sign of the current in the dead time compensation is determined.

Consequently, the information of the radio frequency can be reflected in the sign of the current used for the dead time compensation. In particular, in a case where the fundamental wave current is small, it is possible to prevent that the radio-frequency current does not flow appropriately and the noise reduction cannot be performed.

In the present invention, in the estimation of the radio-frequency current, calculation is performed by using the inverse model of the motor. By using the inverse model of the motor, it is possible to estimate the radio-frequency current with simple calculation.

On the other hand, by a method of estimating the radio-frequency current with reference to a table instead of the inverse model of the motor, the dead time compensation can be appropriately performed similarly. For example, in the dq-axis radio-frequency voltage command values Vdh* and Vqh*, a radio-frequency component is superimposed on a d axis as shown in Expression (5), for example.

[Mathematical Formula 5]

$$\begin{bmatrix} V_{dh}^* \\ V_{qh}^* \end{bmatrix} = \begin{bmatrix} V_h^* \sin(\omega_h t) \\ 0 \end{bmatrix} \quad (5)$$

At this time, the dq-axis radio-frequency current estimation values Idh* and Iqh* are expressed by Expression (6).

[Mathematical Formula 6]

$$\begin{bmatrix} I_{dh}^* \\ I_{qh}^* \end{bmatrix} = \begin{bmatrix} I_h^* \sin(\omega_h t + \theta_{ih}) \\ 0 \end{bmatrix} \quad (6)$$

Since an amplitude Ih* and a phase θih change according to the frequency ωh of the radio-frequency voltage, even when a configuration is made which holds the amplitude Ih* and the phase θih as a map with respect to the frequency ωh of the radio-frequency voltage and refers to a table, a result similar to that of the present invention can be obtained.

As described in the present invention, when the radio-frequency current estimation value is coordinate-transformed, the delay compensation is performed on the magnetic pole position information according to the superimposed frequency ωh by using a coordinate transformation means different from the fundamental wave current command value, so that the phase delay can be compensated appropriately. As a result, it is possible to prevent that the phase of the dead time compensation is deviated due to the phase delay.

Note that the output voltage of the inverter may be compensated according to the three-phase current command values Iu, Iv, and Iw (dead time compensation current estimation values) calculated by the dead time compensation current estimation value calculation unit 26** only when the dq-axis fundamental wave current command values Id* and Iq* are low currents equal to or less than a certain value. Since the radio-frequency voltage is superimposed for the noise reduction in the low-speed range where there is a margin in the output voltage, the compensation of the dead time of the inverter can be effectively performed.

<<First Modification>>

Figure 5:
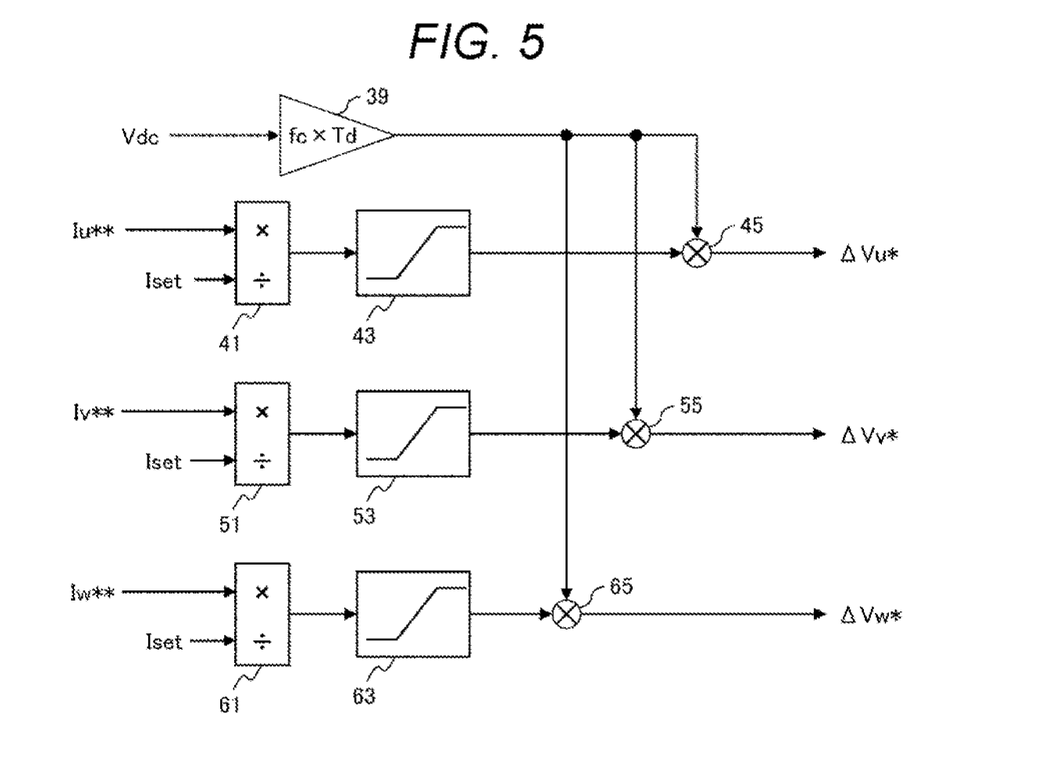
FIG. 5 is a diagram illustrating a modification of a dead time compensator. (First Modification).
Figure 6:
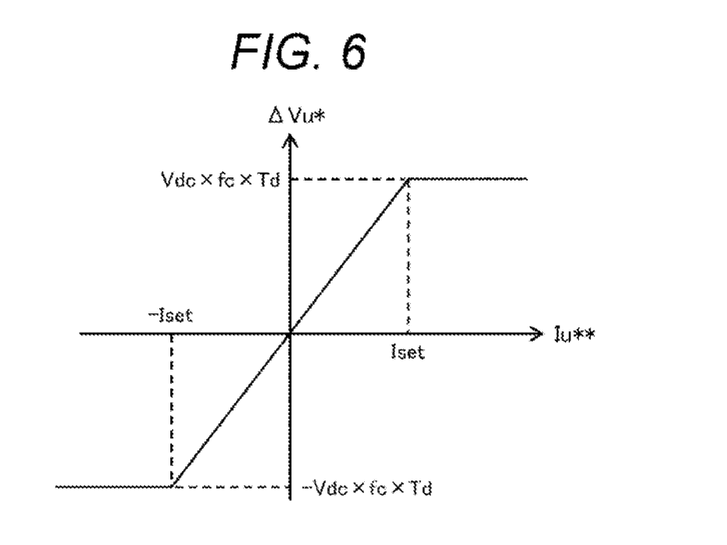
FIG. 6 is a diagram illustrating a relationship between a dead time compensation U-phase current estimation value and a dead time compensation value in FIG. 5.

A modification of the dead time compensation voltage calculation unit (dead time compensator) 28 will be described with reference to FIGS. 5 and 6. FIG. 5 is a diagram illustrating a modification of the dead time compensator, and FIG. 6 is a diagram illustrating a relationship between a dead time compensation U-phase current estimation value and a dead time compensation value in the dead time compensator of FIG. 5.

The dead time compensator (dead time compensation voltage calculation unit) 28 illustrated in FIG. 5 includes dividers 41, 51, and 61, limiters 43, 53, and 63, and dividers 45, 55, and 65 corresponding to the respective phases of the input three-phase current command values Iu, Iv, and Iw**, and outputs the dead time compensation three-phase voltage command values ΔVu*, ΔVv*, and ΔVw* having predetermined slopes with respect to the three-phase current command values Iu, Iv, and Iw**.

In the present embodiment described above, the dead time compensation voltage calculation unit (dead time compensator) 28 performs calculation according to the signs of the three-phase current command values Iu, Iv, and Iw. However, in order to prevent that the dead time compensation voltage is rapidly switched at a zero crossing, as illustrated in FIGS. 5 and 6, the dead time compensation voltage may be set to have a slope with respect to the three-phase current command values Iu, Iv, and Iw.

<<Second Modification>>

Figure 7:
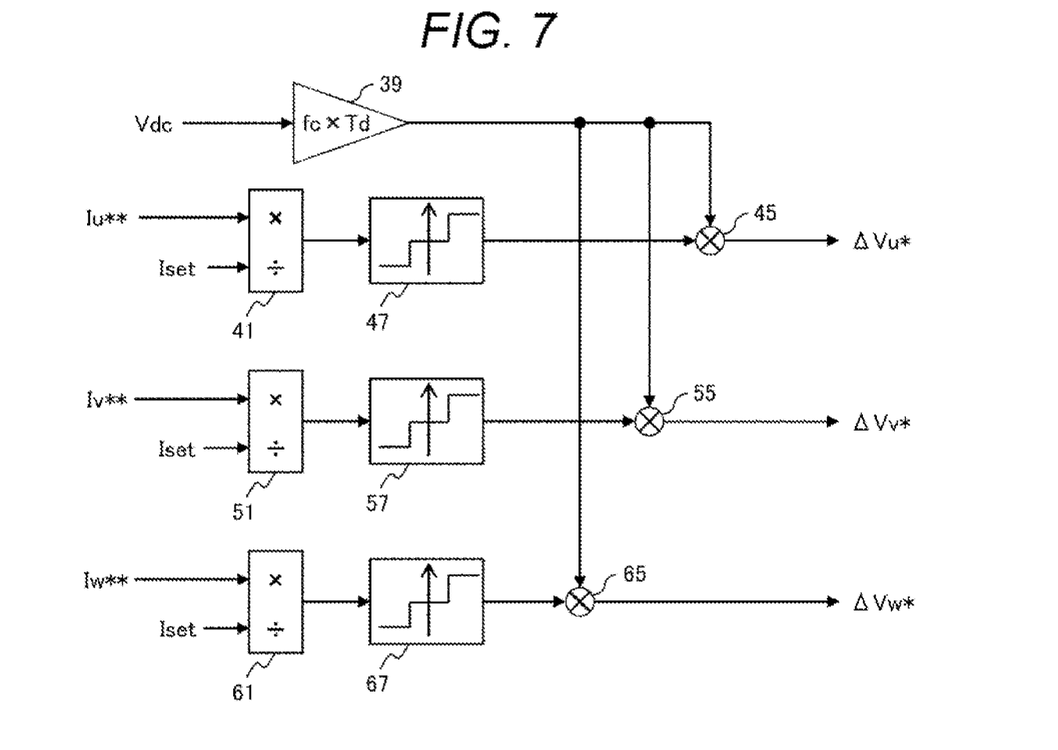
FIG. 7 is a diagram illustrating another modification of the dead time compensator. (Second Modification).

Another modification of the dead time compensation voltage calculation unit (dead time compensator) 28 will be described with reference to FIGS. 7 and 8. FIG. 7 is a diagram illustrating another modification of the dead time compensator, and FIG. 8 is a diagram illustrating a relationship between a dead time compensation U-phase current estimation value and a dead time compensation value in the dead time compensator of FIG. 7.

The dead time compensator (dead time compensation voltage calculation unit) 28 illustrated in FIG. 7 includes the dividers 41, 51, and 61, dead zone setting units 47, 57, and 67, and the dividers 45, 55, and 65 corresponding to the respective phases of the input three-phase current command values Iu, Iv, and Iw**, and outputs the dead time compensation three-phase voltage command values ΔVu*, ΔVv*, and ΔVw* having a dead zone set to zero when the absolute values of the three-phase current command values Iu, Iv, and Iw** are smaller than predetermined values.

Figure 8:
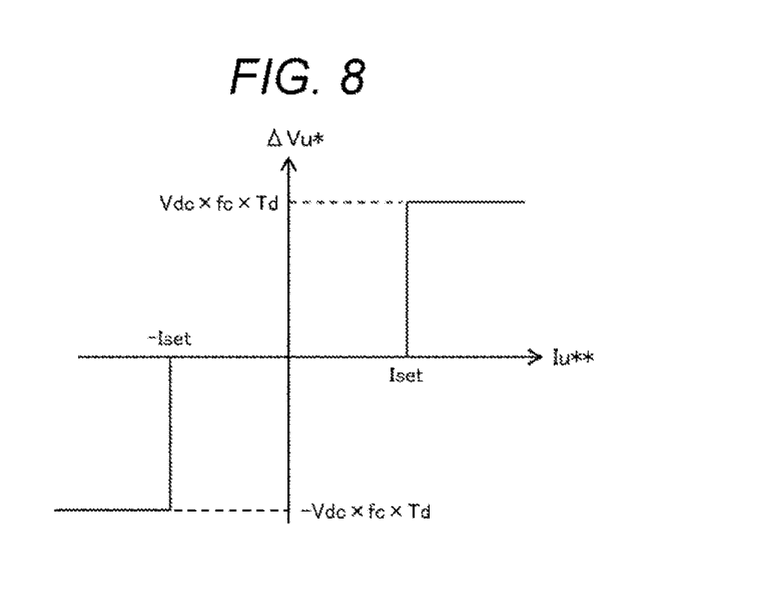
FIG. 8 is a diagram illustrating a relationship between a dead time compensation U-phase current estimation value and a dead time compensation value in FIG. 7.

Similarly to the first modification, in order to prevent that the dead time compensation voltage is rapidly switched at a zero crossing, a method may be used which has a dead zone set to zero when the absolute values of the three-phase current command values Iu, Iv, and Iw are smaller than the predetermined values, as illustrated in FIGS. 7 and 8**.

Second Embodiment

Figure 9:
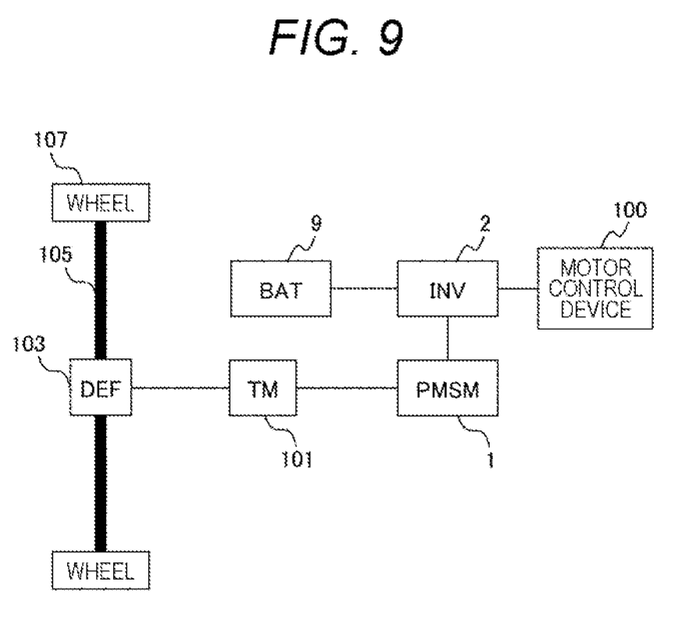
FIG. 9 is a diagram illustrating a schematic configuration of a vehicle according to a second embodiment of the present invention.

A vehicle according to a second embodiment of the present invention will be described with reference to FIG. 9. FIG. 9 is a diagram illustrating a schematic configuration of the vehicle according to the present embodiment.

As illustrated in FIG. 9, the vehicle of the present embodiment includes the permanent magnet synchronous motor (PMSM) 1, the power converter (INV) 2, the DC voltage source (BAT) 9, a motor control device 100, a transmission (TM) 101, a differential gear (DEF) 103, a drive shaft 105, and wheels 107. As the motor control device 100, the motor control device described in the first embodiment (FIG. 1) is used.

As described in the first embodiment, the motor control device 100 controls power supplied from the power converter (INV) 2 to the permanent magnet synchronous motor (PMSM) 1. For example, the DC voltage source (BAT) 9 such as a battery supplies power to the power converter (INV) 2. The permanent magnet synchronous motor (PMSM) 1 is connected to the transmission (TM) 101. The transmission (TM) 101 is connected to the drive shaft 105 via the differential gear (DEF) 103 to supply power to the wheels 107.

A configuration may be adopted in which the permanent magnet synchronous motor (PMSM) 1 is directly connected to the differential gear (DEF) 103 without the transmission (TM) 101, or a configuration may be adopted in which the permanent magnet synchronous motor (PMSM) 1 and the power converter (INV) 2 are applied to each of the front wheel and the rear wheel.

In an automobile, in order to reduce electromagnetic noise from the motor in the low-speed range, a method may be used which superimposes a radio-frequency voltage. In addition, since a carrier frequency is high, the ratio of the dead time to one cycle of the PWM is relatively large, and the application has high importance of the dead time compensation. By applying the present invention, it is possible to prevent that the effect of the control for reducing the electromagnetic noise in the automobile is obstructed by the dead time, and an operator can perform operation comfortably.

The present invention is not limited to the above-described embodiments, and various modifications are included. For example, the above-described embodiments have been described in detail for easy understanding of the present invention and are not necessarily limited to those having all the described configurations. In addition, a part of the configuration of a certain embodiment can be replaced with the configuration of another embodiment, and the configuration of another embodiment can be added to the configuration of a certain embodiment. It is possible to add, delete, and replace other configurations for a part of the configuration of each embodiment.

REFERENCE SIGNS LIST 1 permanent magnet synchronous motor (PMSM)
2 power converter (INV)
3 phase current detection unit
4 magnetic pole position detector
5 frequency calculation unit
6 DC voltage detection unit
7, 16, 18, 24 coordinate transformation unit
9 DC voltage source (BAT)
10 current controller
12 radio-frequency voltage superimposing unit
14 phase delay compensator
20 radio-frequency phase delay compensator
22 radio-frequency current estimation value calculation unit
26 dead time compensation current estimation value calculation unit
28 dead time compensation voltage calculation unit (dead time compensator)
30 dead time compensation unit
32 PWM controller
39 gain
41, 51, 61 divider
43, 53, 63 limiter
45, 55, 65 multiplier
47, 57, 67 dead zone setting unit
100 motor control device
101 transmission (TM)
103 differential gear (DEF)
105 drive shaft
107 wheel

The invention claimed is:

1. An electric motor control device comprising:
a radio-frequency voltage superimposing unit that adds a radio-frequency voltage command value to a fundamental wave voltage command value and outputs a voltage command value;
a radio-frequency current estimation value calculation unit that estimates a radio-frequency current value from the radio-frequency voltage command value;
a dead time compensation current estimation value calculation unit that adds a radio-frequency current estimation value estimated by the radio-frequency current estimation value calculation unit to a fundamental wave current command value; and
a dead time compensation voltage calculation unit that compensates an output voltage of an inverter according to a dead time compensation current estimation value calculated by the dead time compensation current estimation value calculation unit.

2. The electric motor control device according to claim 1, wherein
the radio-frequency current estimation value calculation unit calculates the radio-frequency current estimation value from the radio-frequency voltage command value by using an inverse model of an electric motor to be controlled.

3. The electric motor control device according to claim 1, wherein
different phases used for coordinate transformation are used for the fundamental wave current command value and the radio-frequency current estimation value.

4. The electric motor control device according to claim 1, wherein
the dead time compensation voltage calculation unit includes each limiter corresponding to each phase of input three-phase current command values, and
a dead time compensation voltage, which has a predetermined slope with respect to the three-phase current command value, is output.

5. The electric motor control device according to claim 1, wherein
the dead time compensation voltage calculation unit includes each dead zone setting unit corresponding to each phase of the input three-phase current command values, and
a dead time compensation voltage, which has a dead zone set to zero when an absolute value of the three-phase current command value is smaller than a predetermined value, is output.

6. The electric motor control device according to claim 1, wherein
only when a fundamental wave current is a low current equal to or less than a certain value, the output voltage of the inverter is compensated according to the dead time compensation current estimation value calculated by the dead time compensation current estimation value calculation unit.

7. A vehicle equipped with an electric motor control device that drives an electric motor, wherein
the electric motor control device according to claim 1 is used.

8. An electric motor control method comprising:
adding a radio-frequency voltage command value to a fundamental wave voltage command value and outputting a voltage command value;
estimating a radio-frequency current value from the radio-frequency voltage command value;
adding the estimated radio-frequency current estimation value to a fundamental wave current command value; and
compensating an output voltage of an inverter according to a result of the addition.

9. The electric motor control method according to claim 8, wherein
the radio-frequency current estimation value is calculated from the radio-frequency voltage command value by using an inverse model of an electric motor to be controlled.

10. The electric motor control method according to claim 8, wherein
different phases used for coordinate transformation are used for the fundamental wave current command value and the radio-frequency current estimation value.

11. The electric motor control method according to claim 8, wherein
a dead time compensation voltage, which has a predetermined slope with respect to a three-phase current command value, is output to be added to the fundamental wave voltage command value.

12. The electric motor control method according to claim 8, wherein
a dead time compensation voltage, which has a dead zone set to zero when an absolute value of a three-phase current command value is smaller than a predetermined value, is output to be added to the fundamental wave voltage command value.

13. The electric motor control method according to claim 8, wherein
only when a fundamental wave current is a low current equal to or less than a certain value, the output voltage of the inverter is compensated according to the result of the addition.

* * * * *